Figure 3:
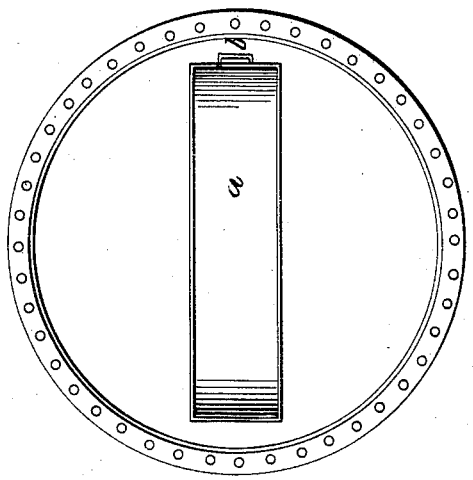
Figure 4:
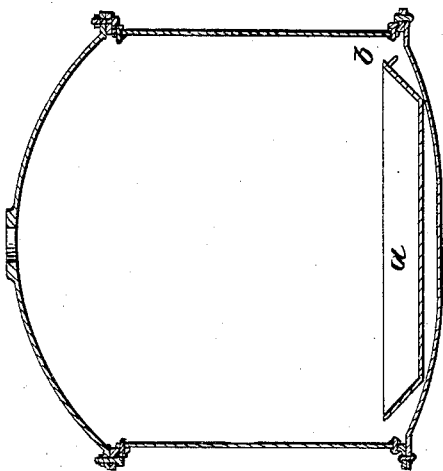
Figure 1:
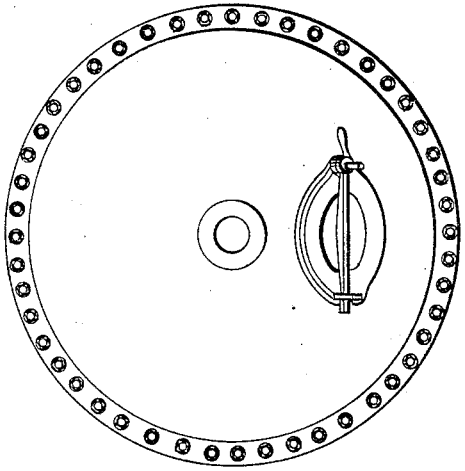
Figure 2:
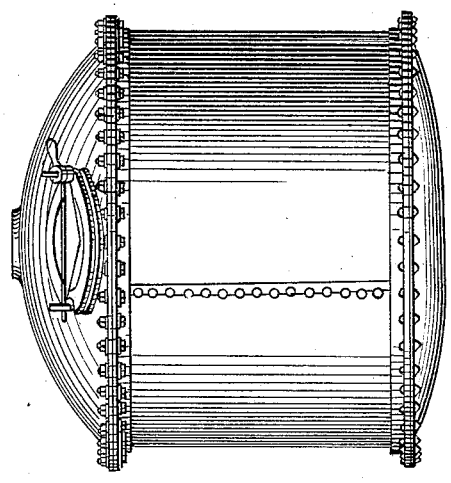

J. MERRILL.
Oil Still.

No. 32,704.

Patented July 2, 1861.

Witnesses
Geo. H. Corey
L. H. Parker

Inventor
Joshua Merrill

UNITED STATES PATENT OFFICE.

JOSHUA MERRILL, OF BOSTON, MASSACHUSETTS.

IMPROVEMENT IN THE DISTILLATION OF HYDROCARBON OILS.

Specification forming part of Letters Patent No. 32,704, dated July 2, 1861.

*To all whom it may concern:*

Be it known that I, JOSHUA MERRILL, of the city of Boston, county of Suffolk, and State of Massachusetts, have invented a certain new and useful Improvement in Distilling Hydrocarbon Oils; and I do hereby declare that the following is a full and accurate description thereof, reference being had to the annexed drawings, making a part of this specification, and to the letters of reference thereon.

In the distillation of hydrocarbon illuminating-oils from crude coal-oil or petroleum it is customary to place caustic soda or caustic potash in the still for the purpose of removing undesirable matters from the oil. This practice, although apparently necessary to the production of good oil, is very destructive to still-bottoms, which, being covered with the alkali, burn out rapidly. There is also a loss of fuel in heating the oil through the layer of alkali.

My said invention consists in a mode of using caustic alkali within the still and in direct contact with the boiling oil without suffering it to lie on the still-bottom by placing the alkali in a pan of suitable size and adapted for the purpose.

The drawings illustrate my invention, Figures Nos. 1 and 2 being views of the still; and Figs. Nos. 3 and 4, sections thereof, showing the pan in position.

Letter *a* represents a long shallow cast-iron pan of sufficient depth to contain the quantity of alkali required. It is made narrow, so that it can be readily withdrawn from the still through the man-hole by the handle *b*, for the purpose of removing incrusted coke and alkali from it after the distillation is completed. The pan rests at each end on the bottom of the still, which, being dished, affords room for the oil to circulate under the bottom of the pan.

I prefer to use the alkali in a solid form, placing it in the pan within the still before filling the still with oil; and after filling the oil I introduce into the pan by means of a pipe a sufficient quantity of solution of caustic alkali to commence the operation.

What I claim as my invention and improvement in distilling hydrocarbon oils is—

The above-described mode, substantially, of using caustic alkali by aid of a pan, as set forth.

JOSHUA MERRILL.

Witnesses:
GEORGE H. CONEY,
L. H. PEASLEE.